: 2,977,282
Patented Mar. 28, 1961

2,977,282

PLANT DISEASE CONTROL

Reed A. Gray, Roselle, N.J. assignor to Merck & Co., Inc., Rahway, N.J., a corporation of New Jersey No Drawing. Filed Feb. 14, 1955, Ser. No. 488,119

10 Claims. (Cl. 167—65)

This invention relates to plant preservation and protection and particularly to the preservation and protection of growing plants from infectious organisms.

Recently there has been an increasing interest in the possible applications of antibiotics for the control of plant diseases. This is due to the unavailability of really satisfactory measures for the control of bacterial blight and certain fungus diseases. It has been discovered that streptomycin and mixtures of streptomycin with oxytetracycline drastically reduce fire blight infections on apple and pear trees when applied as a spray five times during the blossoming season in concentrations of from 30 to 500 parts per million. The effectiveness of streptomycin against the walnut blight organism has shown promise as a prebloom spray at a concentration of about ten parts per million. Cyclohexamide or actidione, an antifungal antiobiotic, appears effective in fruit disease control such as mildew fungi, turf disease and rust of mint and cherry leaf spot when used at the rate of approximately two parts of antibiotic per million parts of solution. Endomycin which is an antibacterial and antifungal agent has been tested against apple scab. Other antibiotics, such as helixin, toximycin, antimycin, thiolutin, gliotoxin and musarin have also been found effective against various plant diseases. Typical of diseases which are treated are bacterial canker, fire blight of pears and apples, bacterial canker of tomato plants, bacterial spot of tomato and pepper plants, black leg and soft-rot in potatoes, grain diseases such as rusts, Panama disease of banana, tobacco blue mold, wild fire of tobacco, and halo blight of beans. Streptomycin up to the present time is the most universally useful antibiotic for the protection of plants against a large range of infectious organisms.

There are, however, two definite deterrents to the widespread application of antibiotics to diseases in the plant kingdom. The most important deterrent to the commercial grower is the cost factor. The cost has been somewhat reduced by the use of crude antibiotics, thereby eliminating expensive purification procedures, but even with this expedient the cost still remains high. The second deterrent is the nature of the application of the antibiotics. The antibiotics are ordinarily sprayed on the plants in aqueous sprays, and there is a definite time element involved in the absorption of antibiotic materials into the plant tissues. Rain is a great hazard since any rain shortly after application will wash away the antibiotic materials. In regions where heavy dews are prevalent the application of antibiotic material is greatly hindered for the same reason. These hazards materially affect the protection of the plants, since it is essential in the use of antibiotics to have them continually present during infectious periods. In the case of fruit trees the infectious or critical time is during the blossom period. The antibiotic is applied to the trees several times during this blossom period to provide continual protection of the trees. The occurrence, therefore, of frequent rains and heavy dews makes the maintenance of this desired condition impossible. Because of these hazards, the use of antibiotics for the protection of plants by commercial growers and farmers has not been widely adapted as the price of the material is such that it cannot be used economically in commercial practice.

An object of the invention is to reduce or eliminate serious losses in commercial plants caused by the destructive effect of infectious organisms. Another object is to provide a protective composition for treating plants which is rapidly absorbed into the plant system. A further object is to provide a commercially practical method of preserving and protecting growing plants from infectious organisms. Other objects and the advantages of the invention will appear hereinafter.

These objects are accomplished in accordance with the invention by applying to plants a composition comprising a combination of antibiotics and polyhydroxy alcohols. This composition is absorbed rapidly into the leaf structure, blossom or even bark, thereby eliminating the hazard of rain or heavy dew in the agricultural application of antibiotics. The degree of antibiotic absorption obtained is as great as fifty-five times that obtained with the conventional aqueous antibiotic solutions lacking a polyhydroxy alcohol.

The optimum concentration of antibiotics in the composition depends to a large extent on the particular antibiotics, the particular infectious organism and the particular plant to be protected. Streptomycin appears far superior to any other antibiotic for general utilization. Other antibiotics, however, are effective against one or more of the various blights and diseases. Typical of the antibiotics which are effective are dihydrostreptomycin, oxytetracycline, chlorotetracycline, tetracycline, actidione, candicidin, bacitracin, aureothricin, fungichromin, 4-amino-3-isoxazolidone (oxamycin), neomycin, chloromycetin, polymixin, streptothricin and the like. Combinations of different antibiotics are also useful, such as for example combinations of 10 to 90% of streptomycin with other antibiotics such as oxytetracycline, chlorotetracycline, 4-amino-3-isoxazolidone or candicidin, other combinations are also useful such as streptothricin-chlorotetracycline, streptothricin-oxamycin and dihydrostreptomycin-oxamycin.

The usual range of antibiotics for a spray is from 5 to 500 parts of antibiotic per million parts of solution although concentrations up to 5000 p.p.m. can be used, and from about 0.05 to 5.0% by volume and preferably 0.1 to 2.5% of polyhydroxy alcohol. In using crude antibiotics the weight used for calculations is the weight based on activity rather than on the actual weight of the crude material. Where a severe cut or canker appears in the plant, it can be treated by the direct application of the antibiotic and polyhydroxy alcohol combination in the form of a paint. Such a paint would have a concentration of antibiotic in an amount of about 0.1 to 50% by weight of the amount of polyhydroxy alcohol. Concentrated formulations can be prepared which are diluted by the ultimate user to the desired concentration. Such a concentrated solution can be a combination of the antibiotic dissolved or suspended in the polyhydroxy alcohol. Where the polyhydroxy alcohol is a solid, a solid physical mixture would be satisfactory which can be dissolved in water prior to application. Alternately, a highly concentrated solution of antibiotic in polyhydroxy alcohol could be adsorbed on a solid inert carrier, such as clay, fuller's earth or diatomaceous earth, and the product marketed in such form that it could be subsequently diluted with clays or other diluents or with water by the ultimate user to the desired concentration for use as a dust or spray. The antibiotic in such mixtures is preferably present in about 5 to 25% by weight of the polyhydroxy alcohol.

The ability of the polyhydroxy alcohol to increase the rate of absorption of the antibiotic by the plant is quite remarkable. With a polyhydroxy alcohol present in amounts as low as 0.1% by volume of an antibiotic spray, the antibiotic has been absorbed approximately seven times more completely than from the conventional antibiotic-water sprays. Any of the polyhydroxy alcohols are effective with the aliphatic polyhydroxy alcohols having a carbon chain length of from two to eight carbon atoms being preferred. The polyhydroxy alcohols with vicinal hydroxy groups having the general formula—

$$R-\left(\begin{array}{c}CH\\|\\OH\end{array}\right)_n-R'$$

wherein R and R′ are hydrogen or alkyl groups containing from one to six carbon atoms and $n$ is a whole integral varying from two to six, and are particularly outstanding in their ability to promote absorption of antibiotics into plants. In this latter group glycerol and sorbitol are of particular merit. Typical examples of other suitable polyhydroxy alcohols are ethylene glycol, diethylene glycol, propylene glycol, butylene glycol, trimethylene gycol, tetramethylene glycol, ethylhexylene gycol, dipropylene glycol, thiodiethylene glycol, triethylene glycol, pentaerythritol, erythritol, adonitol and inositol.

The addition of an adjunct is sometimes desirable to give the composition some particularly desirable characteristic. Typical of such agents are wetting agents, stabilizing agents, buffers, reducing agents, dispersing agents, coloring agents, polyethylene glycols and the like.

Suitable wetting agents are the Tweens which are polyoxyalkylene derivatives of hexitol anhydride, and partial long chain fatty acid esters such as Tween 20 (polyoxyalkylene derivative of sorbitan monolaurate), benzalkonium chloride, sodium lauryl sulfate, and cetyl trimethyl ammonium bromide. Suitable reducing agents which can be mentioned are bisulfites, sulfoxylates, thiosulfates, thiodipropionic acid, thioglycerol and thioglucose. Suitable stabilizing agents are combinations of an acid salt with thiodipropionic acid, sodium salt of sulfurous or hydrosulfurous acid and sodium formaldehyde sulfoxylate. Buffers which are useful are citrates, phosphates and acetates.

Carbowax 1000, Carbowax 1540, Carbowax 4000, polyethylene glycol 200, polyethylene glycol 300 and polyethylene glycol 400 are the most common polyethylene glycols.

The compositions of this invention are conveniently applied as aqueous sprays. It is important in controlling any of the infectious organisms in this manner to maintain the concentration of antibiotic within the plant at a high level during the infectious period. As an example, in the case of fruit trees such as the Bartlett pear, the infectious period is during the blossoming. The trees should, therefore, be sprayed three, four, five or more times during this period, depending on the length of the blossom season. A typical good treatment for Bartlett pears is the application of an aqueous spray containing 50 parts per million of antibiotic and 0.5% by volume of glycerine, four or five times during the blossom period at approximately seven-day intervals. The application of sprays, paints and the like to seeds is also effective in controlling certain forms of infectious organisms.

The following examples are given for the purpose of illustration:

EXAMPLE 1

*Comparison of absorption rate of streptomycin sprays in bean leaves*

One twin primary pinto bean leaf is sprayed on the top surface with an aqueous solution of streptomycin until small droplets form, just before runoff occurs. The other twin leaf of the same size and age is sprayed with an aqueous solution of streptomycin of the same concentration containing a polyhydroxy alcohol. Four plants are used for each treatment. The leaves are harvested 23 hours after spraying and washed for twenty minutes in running water to remove all traces of the antibiotic from the surface of the leaves. The streptomycin remaining in the leaves would not be removable by washing from rain and represents the amount absorbed by the leaves. The leaves are then blotted dry, frozen overnight at −40° C. and thawed. The juice is pressed out in a garlic press and the assays are run using a streptomycin dependent strain of *E. coli.*

The growth zones are measured after incubation for forty hours at 28° C. Comparison of zone diameters with that produced by known concentrations of streptomycin gives a quantitive measure of the antibiotic content. The average concentration in the juice of four plants for each treatment is determined and the averages appear in the table below which includes experiments run at different times.

| P.p.m. Streptomycin In Expressed Leaf Juice [1] | | Agent |
|---|---|---|
| 5,000 p.p.m. Streptomycin Spray | 5,000 p.p.m. Streptomycin Plus Agent | |
| 3.4 | 69.0 | 2% D-sorbitol. |
| 3.2 | 177.0 | 2% Glycerol. |
| 500 p.p.m. Streptomycin Spray | 500 p.p.m. Streptomycin Plus Agent | |
| 2.6 | 175.0 | 2% Glycerol. |
| 3.5 | 19.4 | 0.5% Tween 20+1% Glycerol. |
| 1.6 | 41.0 | 2% Glycerol. |
| 2.8 | 20.0 | 1% Tween 20+2% Glycerol. |
| 5.4 | 61.0 | 1% Glycerol. |
| 2.5 | 32.0 | 0.5% Glycerol. |
| 1.0 | 7.8 | 2% Ethylene glycol. |
| 2.1 | 7.1 | 2% Propylene glycol. |
| 4.2 | 14.0 | 2% Diethylene glycol. |
| 1.0 | 3.8 | 2% Erythritol. |
| 2.1 | 7.2 | 2% Adonitol. |
| 100 p.p.m. Streptomycin Spray | 100 p.p.m. Streptomycin Plus Agent | |
| [2] 1.7 | 6.25 | 0.5 Glycerol. |
| 1.7 | 3.1 | Do. |
| 9.2 | 11.0 | Do. |
| 2.1 | 22.0 | Do. |
| 2.1 | 27.0 | Do. |
| [3] 0.88 | [3] 3.2 | Do. |

[1] Average of four separate determinations on four different plants.
[2] One leaf.
[3] Ten leaves combined.

EXAMPLE 2

*Effect of glycerol on the absorption of streptomycin by leaves of tomato and tobacco plants*

Streptomycin as a spray treatment is used to control the wildfire disease of tobacco caused by *Pseudomonas tabaci* and the bacterial spot disease of tomato caused by *Xanthomonas vesicatoria.* Recent experiments in Florida show that three spray applications of 200 parts per million of streptomycin in aqueous solution to tomato plants give only a small amount (4.0 parts per million) of sterptomycin in the expressed juice from sprayed leaves. This concentration of streptomycin is below the level needed to inhibit the bacterial spot organism in vitro.

The second and fourth leaves from the top of two Bonny Best tomato plants are sprayed on the top surface with 500 parts per million of streptomycin solution, while the third and fifth leaves are sprayed with the same solution containing 1% glycerol. The leaves of two more tomato plants are sprayed in the reverse order; the second and fourth leaves are sprayed with the solution containing 500 parts per million of streptomycin alone. The two leaves on each plant receiving the same treatment are combined for each sample. The leaves are washed, and treated as described in Example 1 for assaying bean leaves. Leaves from White Burley tobacco plants are treated in the same manner. The results are shown in the following table:

| Plant | P.p.m. Streptomycin in Expressed Leaf Juice | |
|---|---|---|
|  | Sprayed 500 p.p.m. Streptomycin | Sprayed 500 p.p.m. Streptomycin +1% Glycerol |
| Tobacco | 1.0 | 20 |
| Do | 1.3 | 18 |
| Do | 0.8 | 66 |
| Do | 0.8 | 19 |
| Average | 1.0 | 31 |
| Tomato | 5.8 | 110 |
| Do | 4.3 | 150 |
| Do | 5.6 | 69 |
| Do | 5.8 | 105 |
| Average | 5.4 | 108 |
| Bean | 3.5 | 18 |
| Do | 1.3 | 24 |
| Do | 3.1 | 17 |
| Do | 4.3 | 58 |
| Average | 3.0 | 29.5 |

The averages in the above table show that the addition of 1% glycerol to a spray containing 500 p.p.m. streptomycin increased the absorption by tomato leaves twenty times, tobacco leaves thirty-one times, and bean leaves about ten times in this experiment.

EXAMPLE 3

*Comparison of streptomycin sprays in effectiveness in controlling the common bean blight disease*

The youngest set of trifoliate leaflets of each of 15 pinto bean plants is inoculated by rubbing the top surfaces of the leaves with a suspension of *Xanthomonas phaseoli* cells and Carborundum powder. An hour later, one leaflet of each set is then sprayed on the lower surface with streptomycin solution and the opposite leaflet of the same age and size is sprayed with the same concentration of streptomycin containing 2% glycerol, and the third leaflet is shielded from the spray and serves as a control. Three plants are used for each treatment. Another spray is applied the following day. Ten days after inoculation, the bacterial lesions are counted on each leaf. The average of the three leaves from different plants receiving the same treatment is determined and the averages are shown in the table below.

| P.p.m. Streptomycin in Both Sprays | Average No. of *X. phaseoli* Lesions per Leaf | | |
|---|---|---|---|
|  | Sprayed with Streptomycin Only | Sprayed with Streptomycin +2% Glycerol | Control |
| 25 | 113 | 17 | 202 |
| 50 | 19 | 0 | 53 |
| 100 | 19 | 0 | 100 |
| 200 | 14 | 0 | 180 |

The results indicate that 50 parts per million of streptomycin spray containing 2% glycerol is better than 200 parts per million of streptomycin alone in controlling the common bean blight disease.

EXAMPLE 4

This experiment was repeated in the exact manner as described for Example 3 except that 1% glycerol was used instead of 2% glycerol and the plants were grown under artificial lights instead of in the greenhouse. The sprays were applied to the bottom surfaces of the leaves one hour after inoculation of the top surfaces with *Xanthomonas phaseoli*, and again on the following day. The results are shown below.

| P.p.m. Streptomycin in Both Sprays | Average No. of *X. phaseoli* Lesions Seven Days After Inoculation [1] | | |
|---|---|---|---|
|  | Sprayed With SM Alone | Sprayed With SM +1% Glycerol | (No Spray) Control |
| 25 | 119 | 45 | 183 |
| 50 | 91 | 34 | 168 |
| 100 | 38 | 6 | 132 |
| 200 | 35 | 7 | 172 |
| 400 | 5 | 4 | 100 |

[1] Average for four leaves on four plants for 25 and 50 p.p.m. streptomycin, and three leaves on three plants for the others.

Although more lesions appeared on the glycerol treated leaves in this experiment than in the last, it appears that a spray containing 50 p.p.m. streptomycin and 1% glycerol is as effective as a spray containing 200 p.p.m. streptomycin alone against the common bean blight disease.

EXAMPLE 5

*Absorption of streptomycin by quince flowers*

A large part of the field application of streptomycin is for controlling fire blight in apples, pears and quinces at the blossom stage. Quince blossoms available from a nursery were brought into the greenhouse and kept at 70° F. The flowers on two branches were sprayed with 400 p.p.m. streptomycin solution and two other branches were sprayed with the same solution containing 1% glycerol. This was repeated for lower concentrations of streptomycin. The front and back of the flowers were sprayed until tiny droplets appeared on the petals just before runoff. One day later five whole flowers were harvested from each treatment and washed by shaking them in a beaker of water for twenty minutes. The water was changed every minute or two.

In another experiment (part B), blossoms were sprayed two times in the bud stage and again after they had opened. The flowers were washed as before and all of them were blotted dry, frozen, thawed, and the juice was pressed out in a garlic press. The streptomycin assays were carried out with the streptomycin dependent strain of *E. coli* after neutralizing the expressed juice with ammonia and drying 0.1 ml. of the juice on a paper disc. The results are shown below.

| P.p.m. Streptomycin in Sprays | P.p.m. Streptomycin Sulfate in Expressed Quince Flower Juice | |
|---|---|---|
|  | Spray SM Alone | Spray SM +1% Glycerol |
| A. ONE SPRAY | | |
| 200 | 2.3 | 5.6 |
| 400 | 5.4 | 26.0 |
| B. TWO SPRAYS ON BUDS AND ONE SRPAY ON OPEN FLOWERS | | |
| 200 | 0 | 2.6 |
| 400 | 2.6 | 14.0 |
| 400 | 2.0 | 18.5 |

The addition of 1% glycerol to sprays containing 200 p.p.m. streptomycin increased the absorption 2.2 times in one experiment and from a non-detectable amount to 2.6 p.p.m. in another experiment. The addition of 1% glycerol to 400 p.p.m. streptomycin increased the absorption by quince flowers 4.8, 5.4 and 9.2 times, respectively, in three different experiments.

Sprayed blossoms were examined daily for injury. No damage was detected in the blossoms from sprays containing as high as 400 p.p.m. streptomycin and 1% glycerol up to two weeks after spraying. Some of the sprayed petals fell off after a week, but this happened with untreated blossoms also.

In another experiment in which older flowers were sprayed once with 400 p.p.m. streptomycin solution, with and without added glycerin, petals of ten flowers were removed from the receptacles and the two parts assayed separately. Twice as much streptomycin was absorbed by the petals sprayed with 400 p.p.m. of streptomycin containing 1% glycerol as with streptomycin alone. The assays of the expressed juice were 25 and 12.5 p.p.m. streptomycin, respectively. No streptomycin was detected in the juice expressed from the receptacles (ovaries and young fruit).

EXAMPLE 6

*Effect of glycerol on the absorption of other antibiotics*

The previous experiments show that glycerol markedly increases the absorption of streptomycin by leaves and flowers. The effect of glycerol on the absorption of other antibiotics was determined in the following experiment and compared with the effect on streptomycin absorption.

One of the primary leaves of a pinto bean plant was sprayed with 500 p.p.m. of the antibiotic on the top surface until small droplets adhered to the leaf. The other twin primary leaf of the same plant was sprayed with the same concentrate of antibiotic containing 1% glycerol. The leaves were harvested twenty-four hours later and washed twenty minutes in running water while completely submerged. They were then blotted dry, frozen, thawed, and the juice was pressed out and assayed on agar plates seeded with *Bacillus subtilis* and also on plates with *Staphylococcus aureus*. The average concentration of antibiotic found in the leaf juice of four different plants was determined and the results are shown in the table below.

| Antibiotic | P.p.m. of Antibiotic Found In Expressed Bean Leaf Juice [1] | |
|---|---|---|
| | Sprayed With 500 p.p.m. of the Antibiotic | Sprayed with 500 p.p.m. Antibiotic+1% Glycerol |
| Streptothricin | less than 5 | 27 |
| Chloromycetin | less than 6 | 55 |
| Streptomycin | less than 3 | 49 |

[1] Average of four replicates.

The results shown in the above table show that the addition of 1% glycerol to solutions containing 500 p.p.m. of the antibiotic increased the absorption of the antibiotic by the bean leaves over five times in the case of streptothricin, over nine times in the case of chloromycetin, and over sixteen times with streptomycin in this experiment.

Any departure from the above description which conforms to the present invention is intended to be included within the scope of the claims.

What is claimed is:

1. A composition useful for protecting growing plants against infectious organisms which consists essentially of an aqeous solution of about 5 to 5000 parts, per million parts of aqueous solution, of an antibiotic effective against plant diseases caused by infectious organisms and about 0.05 to 5% by volume of a polyhydroxy alcohol having the formula R—(CH—OH)$_n$—H wherein R is selected from the group consisting of hydrogen and methyl and *n* is a whole integer varying from two to six, inclusive, when R is hydrogen and is the whole integer two when R is methyl.

2. A composition useful for protecting plants against infectious organisms which comprises an aqueous solution of about 5 to 5000 parts, per million parts of aqueous solution, of an antibiotic effective against plant diseases caused by infectious organisms and about 0.05 to 5% by volume, based on the total aqueous solution, of glycerol.

3. A composition useful for protecting plants against infectuous organisms which comprises an aqueous solution of about 5 to 5000 parts, per million parts of aqueous solution, of an antibiotic effective against plant diseases caused by infectuous organisms and about 0.05 to 5% by volume, based on the total aqueous solution, of a polyhydroxy alcohol having the formula $$R—(CH—OH)_n—H$$

wherein R is selected from the group consisting of hydrogen and methyl and *n* is a whole integer varying from two to six, inclusive, when R is hydrogen and is the whole integer two when R is methyl, the said antibiotic being selected from the group consisting of streptomycin, streptothricin and chloromycetin and being in a concentration of about 5 to 500 parts per million.

4. A composition useful for protecting plants against infectious organisms which comprises an aqueous solution of about 5 to 500 parts per million of streptomycin and about 0.05 to 5% by volume of glycerol.

5. A composition useful for protecting plants against infectuous organisms which comprises an aqueous solution of about 5 to 500 parts per million of streptomycin and about 0.05 to 5% by volume of diethylene glycol.

6. In the method of protecting growing plants subject, during certain periods of the year, to the destructive effect of infectious organisms which comprises spraying the plants with an aqueous solution of an antibiotic effective against plant diseases caused by infectious organisms, said antibiotic being present in a concentration of about 5 to 5000 parts per million, the improvement which comprises adding about 0.05 to 5% by volume of a polyhydroxy alcohol having the formula $$R—(CH—OH)_n—H$$

wherein R is selected from the group consisting of hydrogen and methyl and *n* is a whole integer varying from two to six, inclusive, when R is hydrogen and is the whole integer two when R is methyl.

7. The method as described in claim 6 in which the polyhydroxy alcohol is glycerol.

8. The method as described in claim 6 in which the antibiotic is selected from the group consisting of streptomycin, streptothricin and chloromycetin and is in concentration of about 5 to 500 parts per million.

9. In the method of protecting growing plants subject, during certan periods of the year, to the destructive effect of infectious organisms which comprises spraying the plants with an aqueous solution containing about 5 to 500 parts per million of streptomycin, the improvement which comprises adding to the solution about 0.1 to 2.5% by volume of glycerol.

10. In the method of protecting growing plants subject, during certain periods of the year, to the destructive effect of infectious organisms which comprises spraying the plants with an aqueous solution containing about 5 to 500 parts per million of streptomycin, the improvement which comprises adding to the solution about 0.1 to 2.5% by volume of diethylene glycol.

References Cited in the file of this patent

UNITED STATES PATENTS 2,446,836 King ---------------- Aug. 10, 1948

FOREIGN PATENTS 471,147 Canada ---------------- Jan. 30, 1951

(Other references on following page)

OTHER REFERENCES (1) Phytopathology for November 1948, pp. 899–906 (article by Lieben et al.).

(2) Phytopathology for January 1948, p. 16.

Bourcart: Insecticides, Fungicides and Weed Killers (1925), page 332.

Young et al.: Plant Disease Reporter (December 15, 1951), pages 540–541.

Leffingwell et al.: "Glycerin," Chemical Publishing Co., (1945) pp. 124–130, esp. page 125.

Zaumeher: "Improving Plant Health With Antibiotics," Proceedings First International Conference on the Use of Antibiotics in Agriculture, Publication No. 397, National Academy of Science—National Research Council, 1956, pp. 171–187.

Citing from Zaumeyer, Reference Nos. (5), (15), (23), (24), (29), (30), (35), (37), (48), (58), and (68) published in 1953 and 1954 photo copies in 167–65PP.